(12) United States Patent
Steuber

(10) Patent No.: US 11,898,921 B2
(45) Date of Patent: Feb. 13, 2024

(54) AIR BEARING APPARATUS FOR CALIBRATING FORCE MEASUREMENT DEVICES

(71) Applicant: Honeywell Federal Manufacturing & Technologies, LLC, Kansas City, MO (US)

(72) Inventor: Jason Steuber, Kansas City, MO (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 19 days.

(21) Appl. No.: 17/746,438

(22) Filed: May 17, 2022

(65) Prior Publication Data
US 2023/0375427 A1     Nov. 23, 2023

(51) Int. Cl.
*G01L 25/00*     (2006.01)
*F16C 32/06*     (2006.01)

(52) U.S. Cl.
CPC .......... *G01L 25/00* (2013.01); *F16C 32/0607* (2013.01)

(58) Field of Classification Search
CPC . G01L 25/003; G01L 5/16; G01L 5/04; G01L 25/00; G01M 1/10; G01M 9/06; G01M 7/02; G01M 1/12; G01B 21/20; G01B 21/30; G01B 21/047; G01B 5/008; G01B 11/2441; G01B 21/042; G01N 11/10; G01N 19/02; B25J 9/1692; F16C 32/0607
See application file for complete search history.

(56) References Cited

U.S. PATENT DOCUMENTS

| | | | | |
|---|---|---|---|---|
| 10,309,406 | B2 * | 6/2019 | Fujita | ............... F04D 25/0613 |
| 2006/0049557 | A1 * | 3/2006 | Motz | ............... F16F 15/0275 |
| | | | | 267/136 |
| 2010/0212436 | A1 * | 8/2010 | Swenson | ............... G01N 1/2208 |
| | | | | 73/863.22 |
| 2014/0199005 | A1 * | 7/2014 | Sato | ............... F16C 33/208 |
| | | | | 29/898.15 |

FOREIGN PATENT DOCUMENTS

| | | |
|---|---|---|
| CA | 2509931 | 9/2011 |
| CN | 103542241 | 6/2016 |
| GB | 884915 | 12/1961 |
| JP | 2008082356 | 4/2008 |
| JP | 5408613 | 11/2013 |

* cited by examiner

*Primary Examiner* — Brandi N Hopkins
(74) *Attorney, Agent, or Firm* — Hovey Williams LLP

(57) ABSTRACT

An air bearing for calibrating a force measurement device comprises an inner wall, an outer wall, an upper wall, a lower wall, an internal chamber, an object retention opening, and a plurality of air outlets. The inner wall and outer wall each have a cylindrical shape with the outer wall being concentric with the inner wall. The upper wall and lower wall each have an annular shape and are attached to the inner wall and the outer wall. The internal chamber is formed by inner surfaces of the four walls, and is configured to retain compressed air. The object retention opening is formed by an outer surface of the inner wall and is configured to receive and retain an object. The air outlets are positioned along the inner wall and are configured to allow compressed air to flow from the internal chamber to the object retention opening.

15 Claims, 8 Drawing Sheets

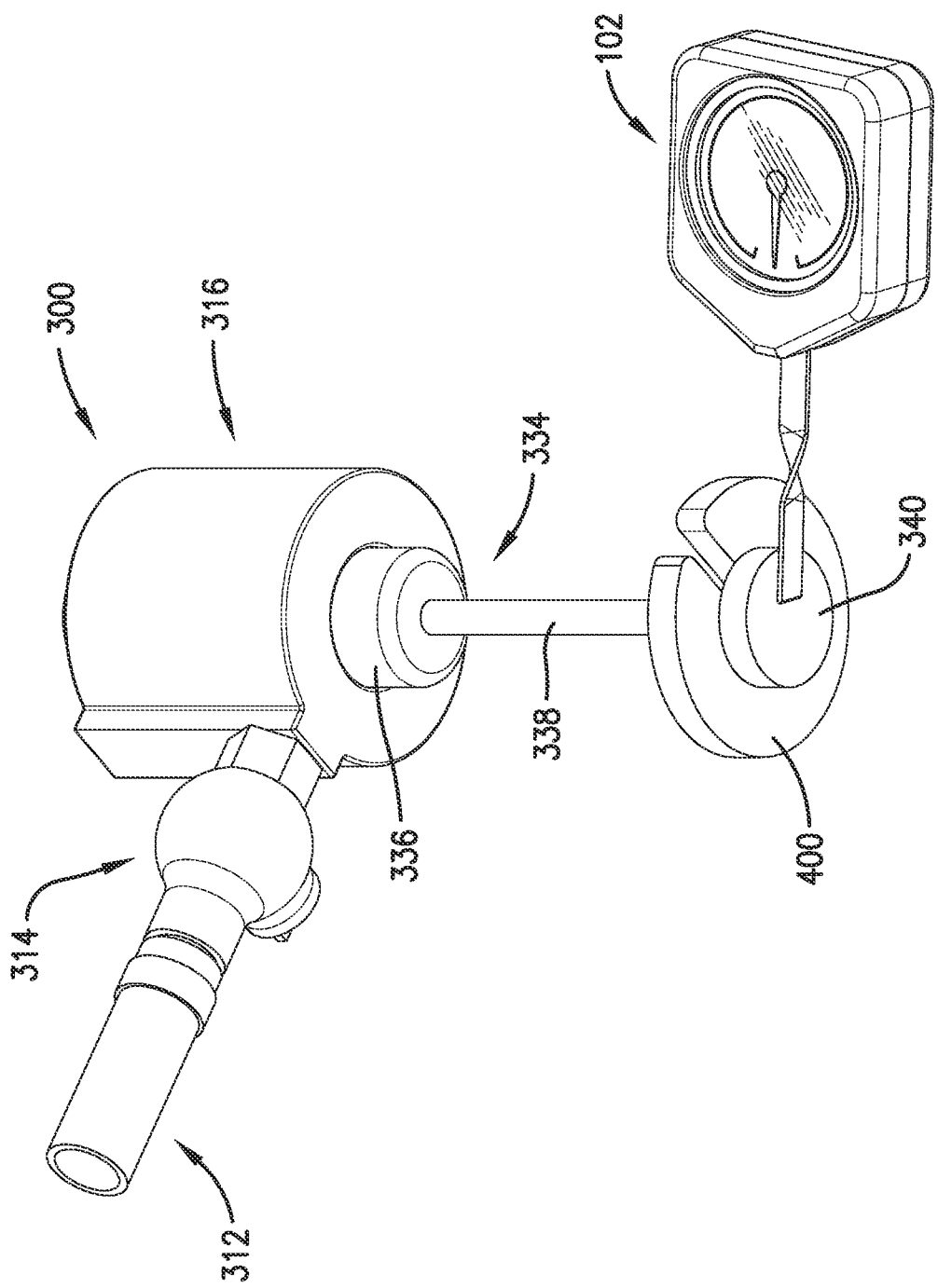

AIR BEARING APPARATUS FOR CALIBRATING FORCE MEASUREMENT DEVICES

STATEMENT REGARDING FEDERALLY-SPONSORED RESEARCH OR DEVELOPMENT

This invention was made with Government support under Contract No.: DE-NA0002839 awarded by the United States Department of Energy/National Nuclear Security Administration. The Government has certain rights in the invention.

FIELD OF THE INVENTION

Embodiments of the current invention relate to apparatuses used for calibrating force measurement devices.

DESCRIPTION OF THE RELATED ART

A dynamometer is a device that can be used to measure various forces. One type of dynamometer is a tension gauge that includes a housing and an arm that extends outward from the housing and connects to force-determining components within the housing. A force may be applied to the arm to displace, or pivot, the arm in one of two opposing directions. The tension gauge further includes a dial which displays the amount of force applied to the arm in either direction.

A button load cell is a device that is generally used to measure the weight of an object. The button load cell typically includes a cylindrical housing with a circumferential side wall attached to an upper wall and a spaced apart lower wall. The upper wall may include an upward protruding disc or button. The button load cell further includes force measurement components inside the housing which measure the compressive force on the housing, i.e., the weight of the object, and output an electronic signal whose value varies according to the force, or weight.

The tension gauge and the button load cell are calibrated to provide accurate measurements by having each one measure the weight of a reference mass whose weight or mass is known with high precision. The reference mass is typically cylindrical shaped with a circumferential side surface, a planar lower surface, and a spaced apart upper surface. The upper surface may include a knob, or other features, with which the reference mass may be handled. The reference mass is retained by an apparatus, such as a bearing, that includes a central opening in which the reference mass is positioned. The arm of the tension gauge or the upper surface of the button load cell is placed underneath the reference mass in contact with the lower surface thereof. In order to provide the known amount of weight to the tension gauge or the button load cell, the reference mass should be held upright, i.e., with a longitudinal axis of the reference mass aligned with the vertical axis, and with no other axial forces acting on the reference mass. However, it is likely that, especially when calibrating the tension gauge, the side surface of the reference mass is going to contact the surface of the opening of the retaining apparatus. Any contact between the reference mass and the retaining apparatus creates a frictional force that opposes the gravitational force and will result in less than the full amount of weight being transferred from the reference mass to the tension gauge or the button load cell. Therefore, the tension gauge or the button load cell will be improperly calibrated and will produce inaccurate measurements.

SUMMARY OF THE INVENTION

Embodiments of the current invention address one or more of the above-mentioned problems and provide an air bearing apparatus which retains an object, such as a reference mass or a mass support structure configured to hold a reference mass, and eliminates any contact between the object and the air bearing apparatus while a tension gauge or a button load cell is being calibrated. The apparatus includes an air bearing which receives compressed air and applies air pressure to the object to hold it in position which the device is being calibrated.

The air bearing broadly comprises an inner wall, an outer wall, an upper wall, a lower wall, an internal chamber, a fitting opening, an object retention opening, and a plurality of air outlets. The inner wall and the outer wall each have a cylindrical shape, with the outer wall having a diameter that is greater than a diameter of the inner wall and being concentric with the inner wall. The upper wall and the lower wall each have an annular shape, with the upper wall attached to the upper edges of the inner wall and the outer wall, and the lower wall attached to the lower edges of the inner wall and the outer wall. The fitting opening is positioned on the outer wall and is configured to retain an air supply fitting. The internal chamber is formed by inner surfaces of the inner wall, the outer wall, the upper wall, and the lower wall, and is configured to retain compressed air. The object retention opening is formed by an outer surface of the inner wall and is configured to receive and retain an object contributing to a force measured by the force measurement device. The air outlets are positioned along the inner wall and are configured to allow compressed air to flow from the internal chamber to the object retention opening to apply air pressure to the object.

Another embodiment of the current invention provides an air bearing apparatus for calibrating a force measurement device. The air bearing apparatus broadly comprises an air bearing, a fitting, and an air supply hose. The air bearing comprises an inner wall, an outer wall, an upper wall, a lower wall, an internal chamber, a fitting opening, a mass retention opening, and a plurality of air outlets. The inner wall and the outer wall each have a cylindrical shape, with the outer wall having a diameter that is greater than a diameter of the inner wall and being concentric with the inner wall. The upper wall and the lower wall each have an annular shape, with the upper wall attached to the upper edges of the inner wall and the outer wall, and the lower wall attached to the lower edges of the inner wall and the outer wall. The fitting opening is positioned on the outer wall and is configured to retain an air supply fitting. The internal chamber is formed by inner surfaces of the inner wall, the outer wall, the upper wall, and the lower wall, and is configured to retain compressed air. The object retention opening is formed by an outer surface of the inner wall and is configured to receive and retain an object contributing to a force measured by the force measurement device. The air outlets are positioned along the inner wall and are configured to allow compressed air to flow from the internal chamber to the object retention opening to apply air pressure to the object. The fitting is attached to the fitting opening through which compressed air passes. The air supply hose has a first end attached to the fitting and a second end configured to receive compressed air.

Yet another embodiment of the current invention provides a method of forming an air bearing for use with calibrating a force measurement device. The method broadly comprises the steps of forming an inner wall having a cylindrical shape with a diameter that is greater than a diameter of an object contributing to a force measured by the force measurement device, the inner wall defining an object retention opening; forming an outer wall having a cylindrical shape with a diameter that is greater than the diameter of the inner wall and concentric with the inner wall; forming an upper wall having an annular shape with an inner circumference attached to an upper edge of the inner wall and an outer circumference attached to an upper edge of the outer wall; forming a lower wall having an annular shape with an inner circumference attached to a lower edge of the inner wall and an outer circumference attached to a lower edge of the outer wall, wherein inner surfaces of the inner wall, the outer wall, the upper wall, and the lower wall form the boundaries of an internal chamber; and forming a plurality of air outlets along the inner wall, the air outlets configured to allow compressed air to flow from the internal chamber to the object retention opening.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the current invention are described in detail below with reference to the attached drawing figures, wherein:

FIG. 1 is an upper perspective environmental view of a tension gauge, a reference mass, and an air bearing apparatus, constructed in accordance with various embodiments of the current invention and including an air bearing, an air supply hose, and a fitting, wherein the tension gauge is set up to measure a weight of the reference mass as the reference mass is being retained by the air bearing apparatus;

Figure 7:
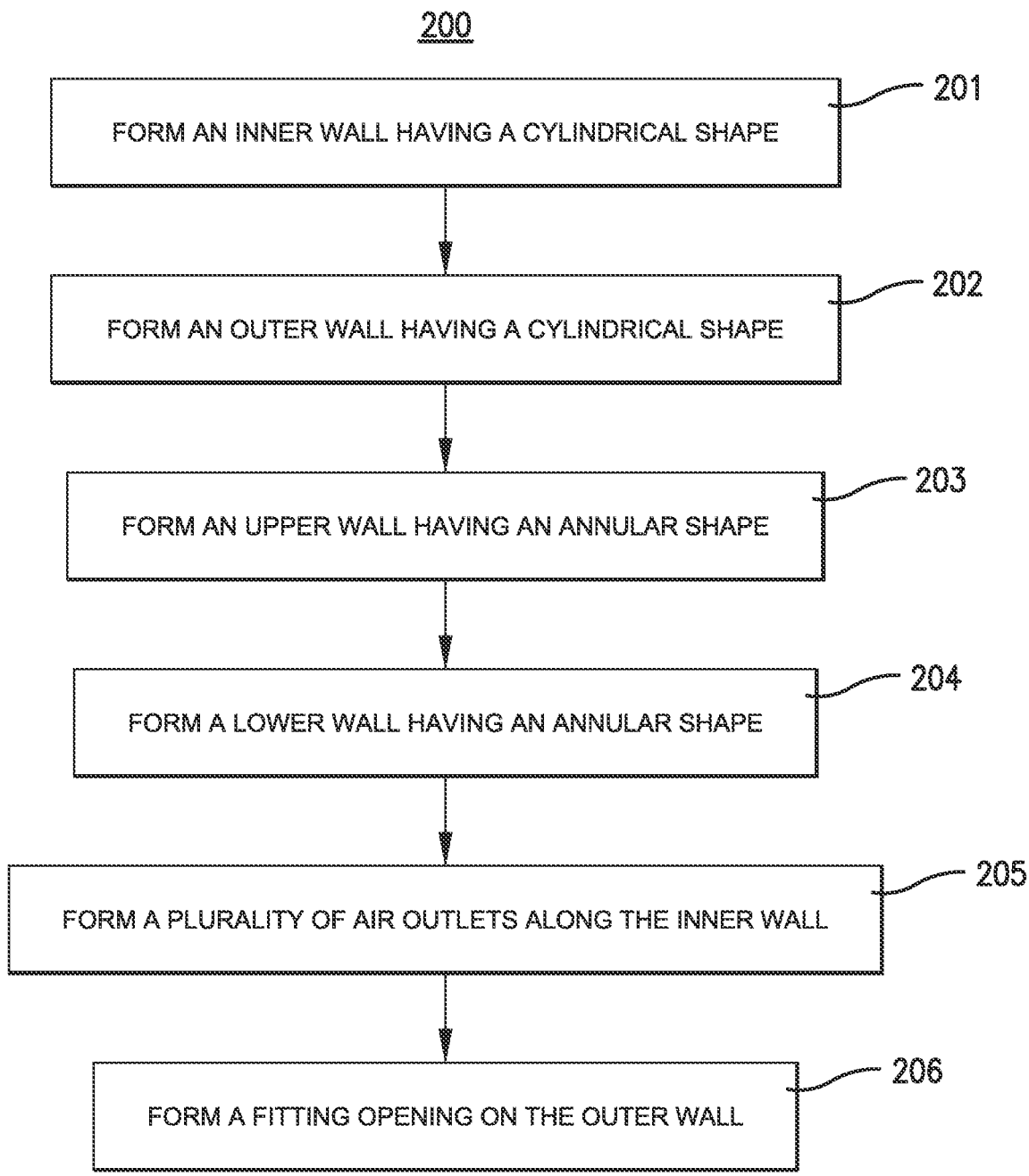
Figure 8:
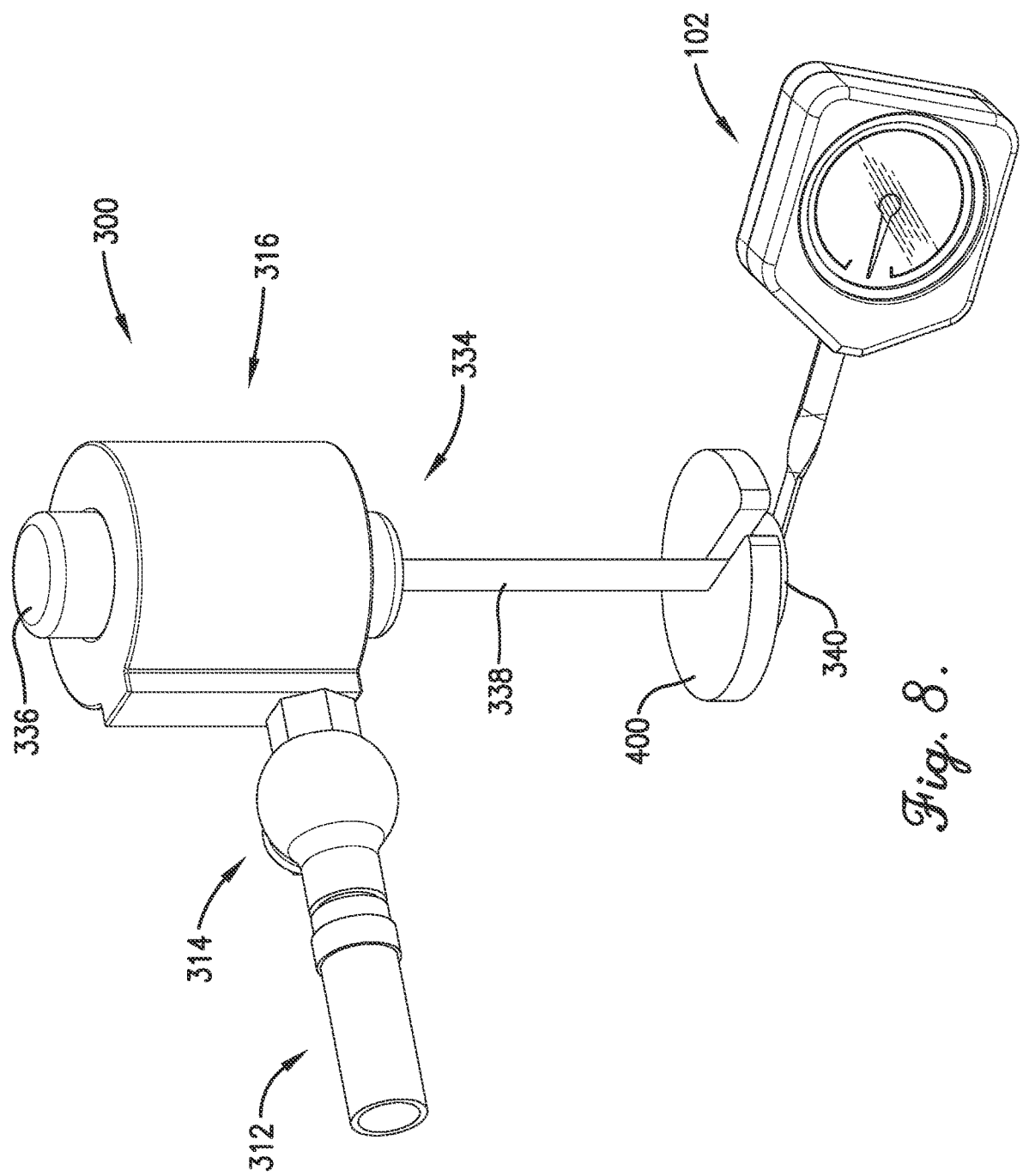

FIG. 7 includes a listing of at least a portion of the steps of a method of forming an air bearing configured to retain a reference mass;

FIG. 8 is an upper perspective environmental view of the tension gauge, another embodiment of the reference mass, and another embodiment of the air bearing apparatus; and FIG. 9 is a lower perspective view of the environment of FIG. 8.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the technology references the accompanying drawings that illustrate specific embodiments in which the technology can be practiced. The embodiments are intended to describe aspects of the technology in sufficient detail to enable those skilled in the art to practice the technology. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

Relational and/or directional terms, such as "above", "below", "up", "upper", "upward", "down", "downward", "lower", "top", "bottom", "outer", "inner", etc., along with orientation terms, such as "horizontal" and "vertical", may be used throughout this description. These terms are used with reference to embodiments of the technology and the positions, directions, and orientations thereof shown in the accompanying figures. Embodiments of the technology may be positioned and oriented in other ways or move in other directions. Therefore, the terms do not limit the scope of the current technology.

Figure 1:
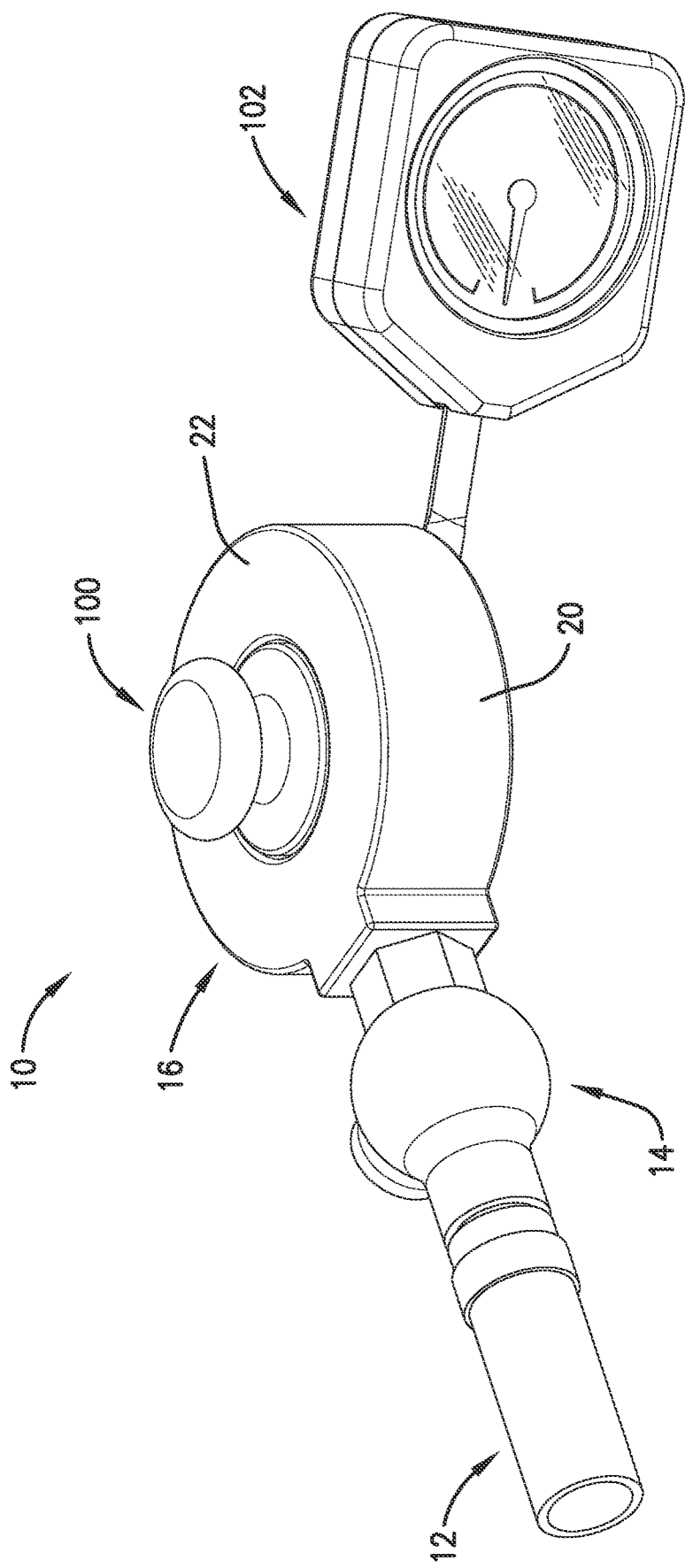
Figure 2:
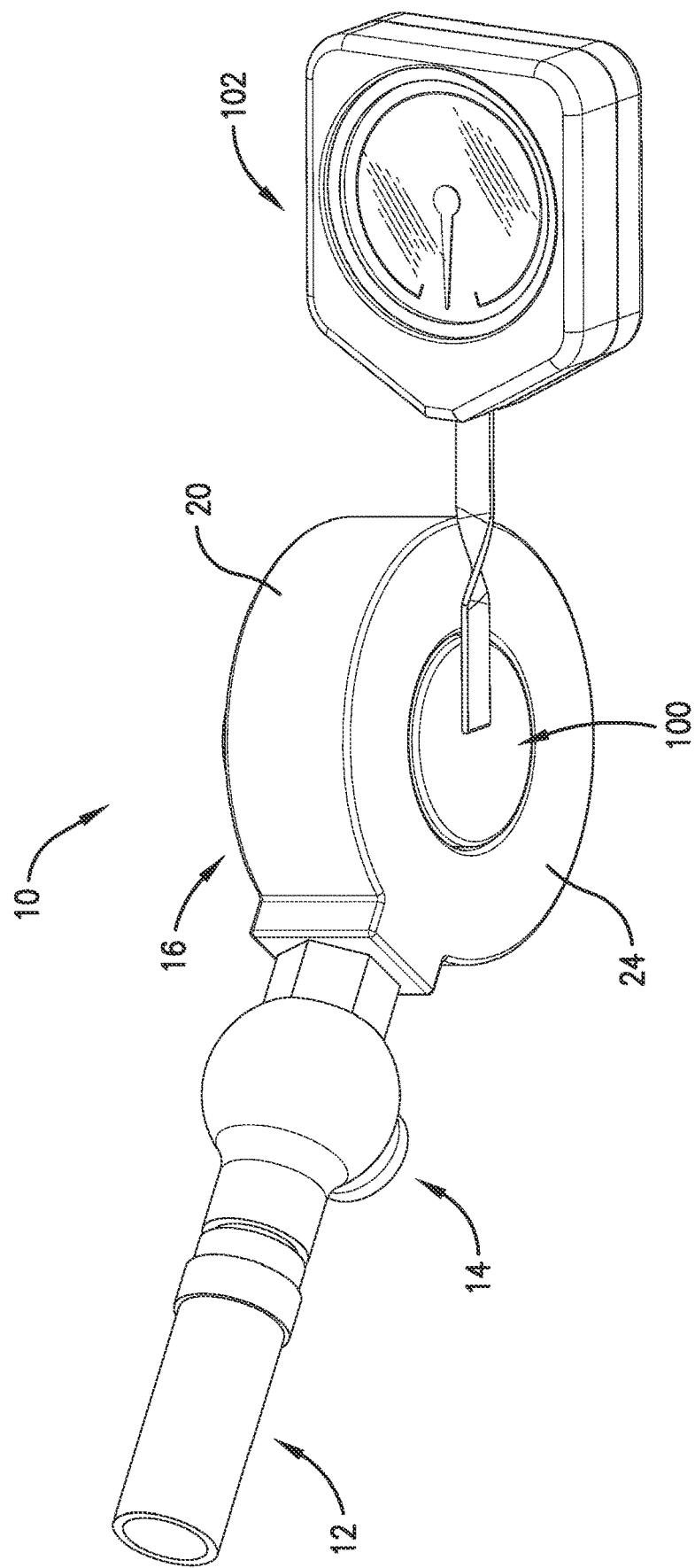
FIG. 2 is a lower perspective view of the environment of FIG. 1.
Figure 3:
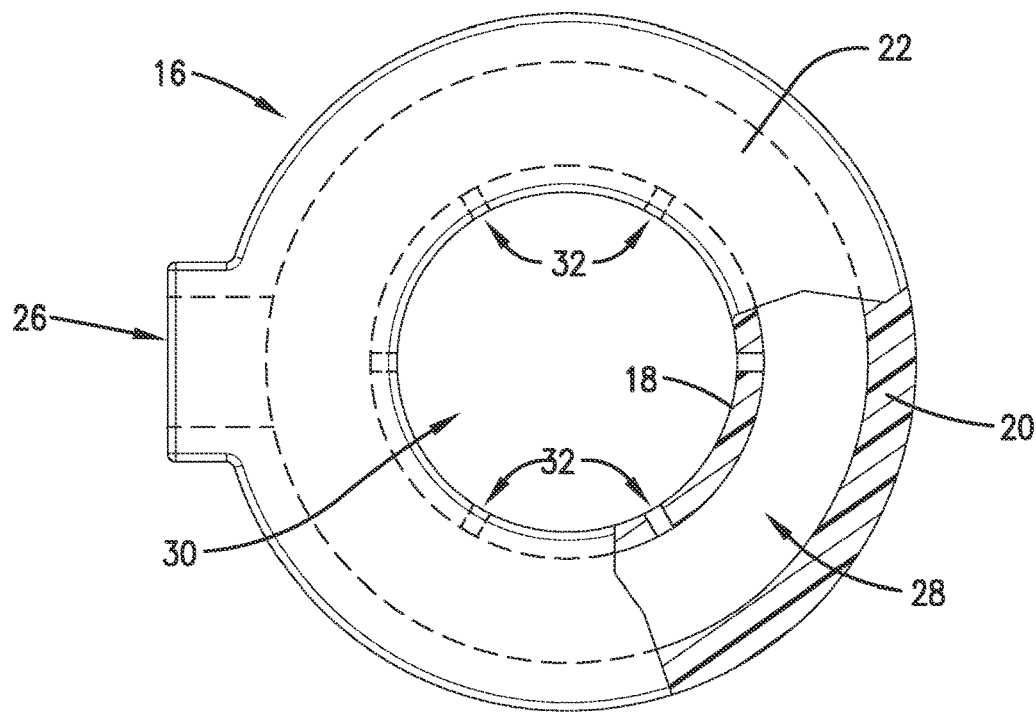
FIG. 3 is a top plan view of the air bearing.
Figure 4:
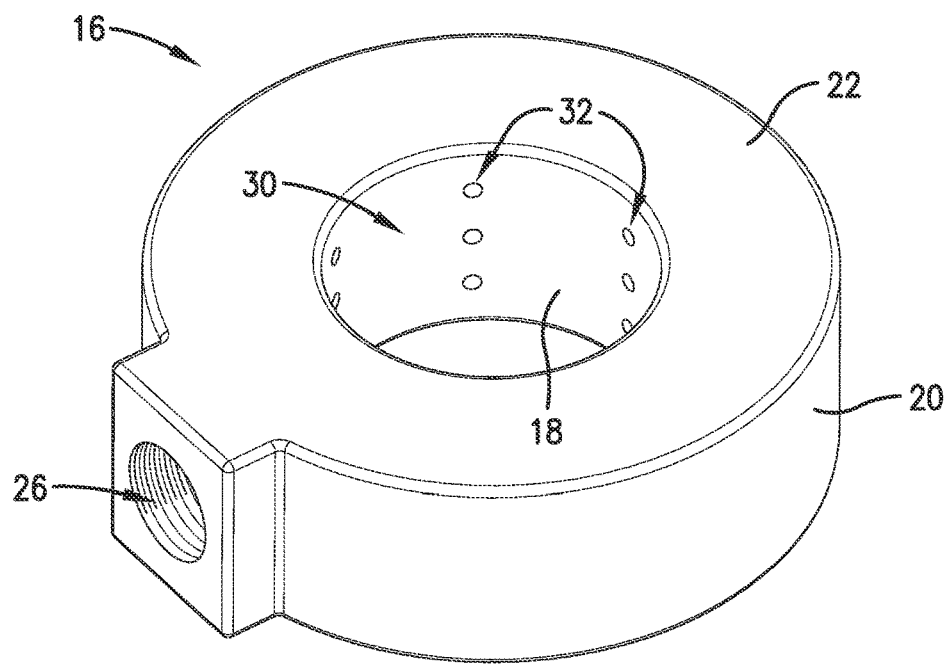
FIG. 4 is an isometric perspective view of the air bearing.
Figure 5:
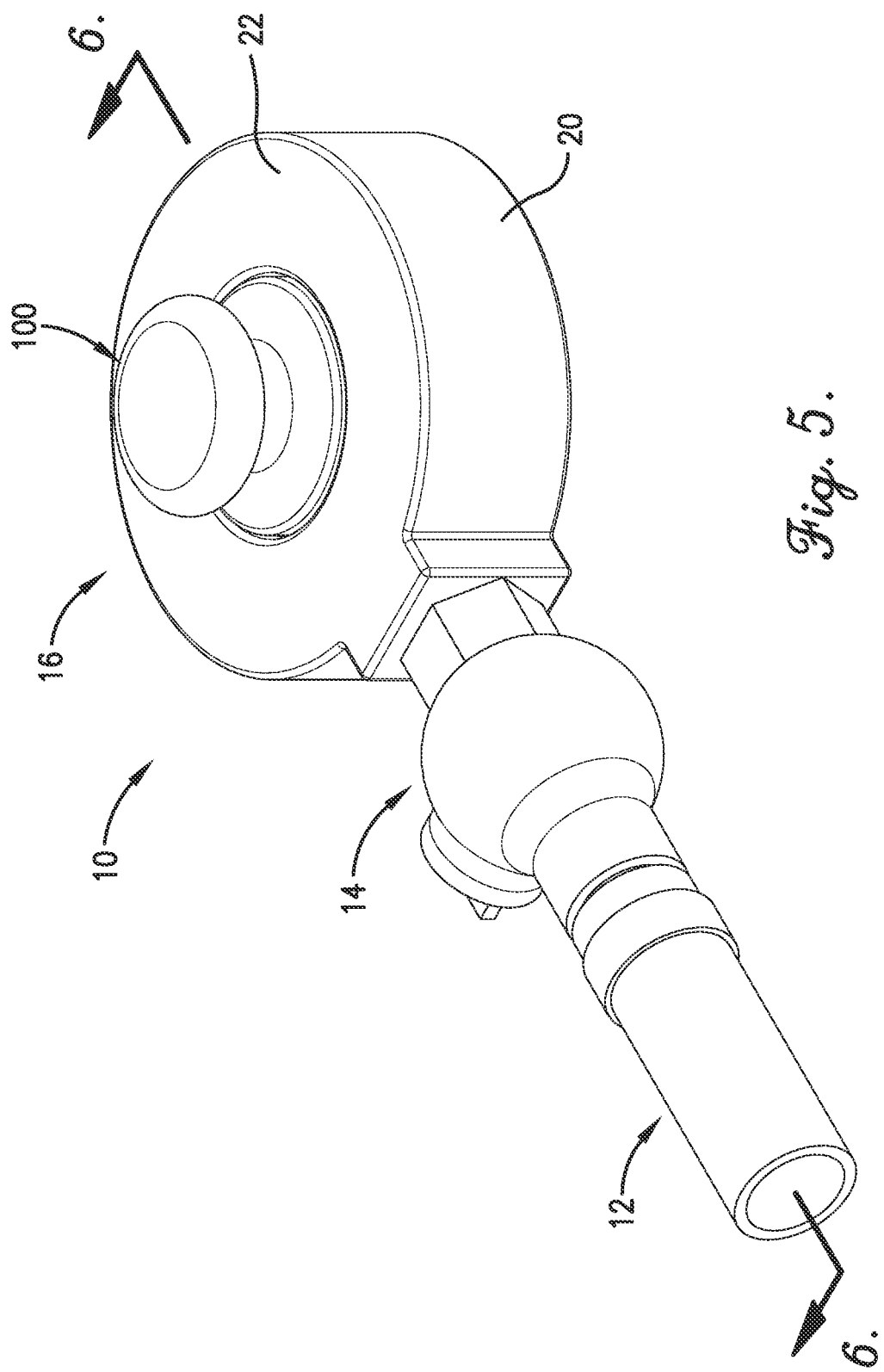
FIG. 5 is an isometric perspective view of the air bearing apparatus and the reference mass.

An air bearing apparatus 10, constructed in accordance with various embodiments of the current invention, is shown in FIGS. 1 and 2. The air bearing apparatus 10 is configured to retain a reference mass 100 while the reference mass 100 is having its weight measured by a dynamometer, such as a tension gauge 102, as shown in FIGS. 1 and 2, or a button load cell. The reference mass 100, or standard weight, is an object whose weight or mass is known with a high degree of precision. The air bearing apparatus 10 retains the reference mass 100 such that the reference mass 100 is held by compressed air, or air pressure, only and such that no frictional forces act on the reference mass 100. Thus, the full weight of the reference mass 100 is transferred to the dynamometer or the load button cell. Using this inventive setup, the dynamometer or the load button cell can be calibrated with a high degree of precision.

The reference mass 100 is typically formed from metals and/or metal alloys and often has a cylindrically shaped body with a circumferential side surface, a planar lower surface, and a spaced apart upper surface. The reference mass 100 may further include a knob, or similar feature, attached to the upper surface of the body to provide ease of handling of the reference mass 100.

The tension gauge 102 is merely exemplary of a dynamometer or any other device, such as a button load cell, which is configured to measure the weight of an object or measure a force exerted by an object. The tension gauge 102 includes a housing and an arm that extends outward from the housing and connects to force-determining components within the housing. A force may be applied to the arm to displace, or pivot, the arm in one of two opposing directions. The tension gauge further includes a dial which displays the amount of force applied to the arm in either direction.

The air bearing apparatus 10 includes an air supply hose 12, a fitting 14, and an air bearing 16. A first end of the air supply hose 12 is attached to the fitting 14. A second end of the air supply hose 12 receives compressed air from an air compressor (not shown in the figures). The fitting 14, or connector, attaches to an opening on the air bearing 16.

The air bearing 16, as shown in FIGS. 1-6, generally retains the reference mass 100 in a frictionless setting. The air bearing 16 includes an inner wall 18, an outer wall 20, an upper wall 22, a lower wall 24, a fitting opening 26, an internal chamber 28, an object retention opening 30, and a plurality of air outlets 32.

The inner wall 18 has a shape which is complementary to the shape of the outer surface of the reference mass 100 so that the inner wall 18 can surround the outer surface of the reference mass 100 with a gap or space there between. Given that the exemplary reference mass 100 has a cylindrical shape, the inner wall 18 also has a generally cylindrical or circular shape with an inner surface and an outer surface.

The outer wall 20 has a generally cylindrical or circular shape with an inner surface and an outer surface. The outer wall 20 has a diameter that is greater than the diameter of the inner wall 18 and is generally concentric with the inner wall 18.

The upper wall 22 and the lower wall 24 are spaced apart from one another. The upper wall 22 has a generally annular shape with an inner circumference attached to an upper edge of the inner wall 18 and an outer circumference attached to an upper edge of the outer wall 20. The lower wall 24 has a generally annular shape with an inner circumference attached to a lower edge of the inner wall 18 and an outer circumference attached to a lower edge of the outer wall 20. The upper wall 22 and the lower wall 24 each have an inner surface and an outer surface.

The inner wall 18, the outer wall 20, the upper wall 22, and the lower wall 24 may be formed from rigid materials such as polymers, glass, metals and/or metal alloys, or the like. In addition, the inner wall 18, the outer wall 20, the upper wall 22, and the lower wall 24 form a body of the air bearing 16 that is typically a single unit or monolithic and may be formed by additive manufacturing techniques such as 3D printing.

The fitting opening 26 is a through hole opening that is typically threaded. The fitting opening 26 is positioned on the outer wall 20 along an area of the outer wall that has a greater thickness than the rest of the outer wall 20. The fitting opening 26 receives and retains the fitting 14 for the air supply hose 12.

The internal chamber 28 retains compressed air and is formed or defined by inner surfaces of the inner wall 18, the outer wall 20, the upper wall 22, and the lower wall 24. The object retention opening 30 receives and retains the reference mass 100 and is formed or defined by the outer surface of the inner wall 18. The object retention opening 30 has a dimension, or diameter, that is determined by a dimension, or diameter, of the inner wall 18. The dimension, or diameter, of the object retention opening 30 is greater than the dimension, or diameter, of the reference mass 100 so that there is a gap or space of a predetermined length between the inner wall 18 and the reference mass 100.

The air outlets 32 permit compressed air to flow from the internal chamber 28 to the object retention opening 30. Each air outlet 32 is a through hole opening that extends from the inner surface of the inner wall 18 to the outer surface. The air outlets 32 are spaced apart from one another and distributed along the height and the circumference of the inner wall 18. An exemplary configuration of the air outlets 32 includes eight columns of air outlets 32 distributed evenly around the circumference of the inner wall 18, with each column including three air outlets 32 evenly spaced apart from one another along the height of the inner wall 18. The air outlets 32 are positioned around the circumference of the inner wall 18 such that select pairs of columns of air outlets 32 align along diameters of the inner wall 18. For example, referring to FIG. 6, a first column of air outlets 32A is positioned diametrically opposed to a second column of air outlets 32B. This diametric alignment of the air outlets 32 maintains the position of the reference mass 100 to be roughly in the center of the object retention opening 30.

Figure 6:
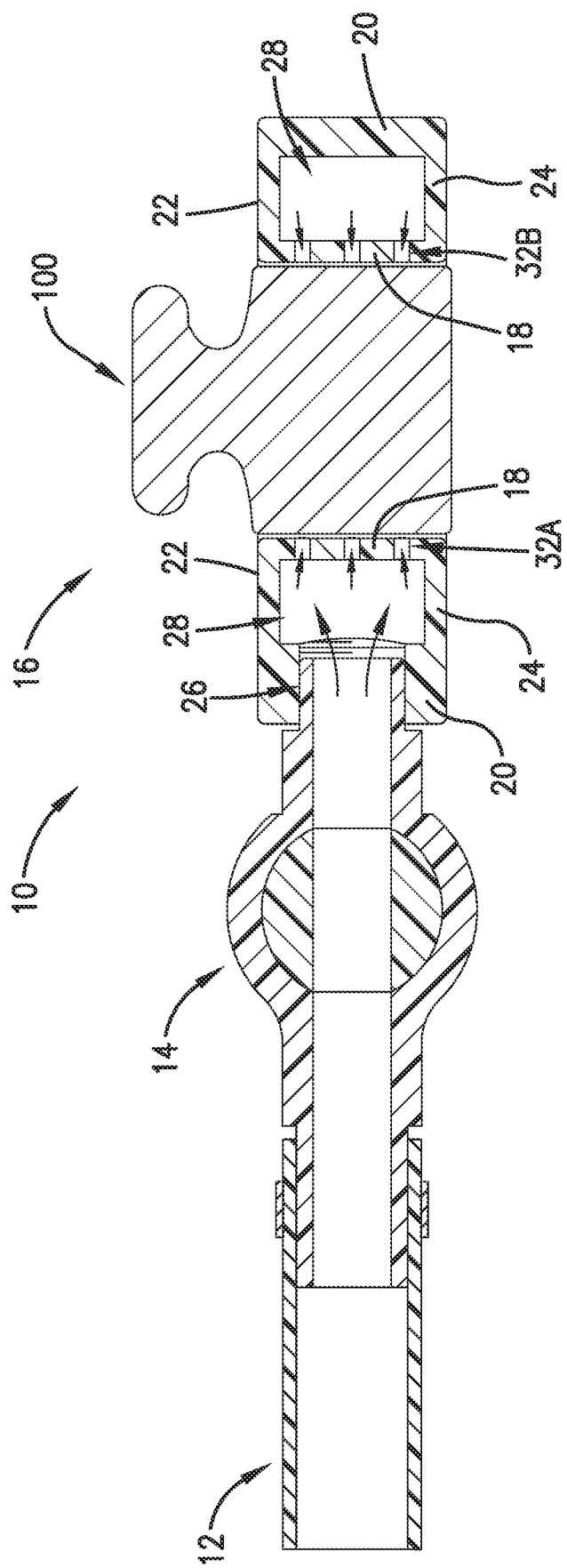
FIG. 6 is a side cross-sectional view of the air bearing apparatus and the reference mass, illustrating a flow of air from the air bearing apparatus to the reference mass.

Referring to FIGS. 1, 2, and 6, the air bearing apparatus 10 may operate and be used as follows. The second end of the air supply hose 12 is connected to an air compressor (not shown in the figures). Compressed air, at a selected pressure, flows through the air supply hose 12, through the fitting 14, and into the internal chamber 28 of the air bearing 16. Compressed air, shown in dashed lines in FIG. 6, exits the internal chamber 28 through the air outlets 32 and into the object retention opening 30.

The air bearing 16 may be mounted on, or held by, a fixture (not shown in the figures) that allows the device to be calibrated to be placed underneath the air bearing 16. The dynamometer or load button cell is placed beneath the object retention opening 30. As shown in FIGS. 1 and 2, the arm of the tension gauge 102 is positioned just below the object retention opening 30. The reference mass 100 is positioned in the object retention opening 30 and lowered so that a bottom surface of the reference mass 100 contacts the arm. The reference mass 100 is held in the object retention opening 30 by compressed air so that the reference mass 100 only contacts the arm of the tension gauge 102—thereby transferring the full amount of its weight to the tension gauge 102.

FIG. 7 depicts a listing of at least a portion of the steps of an exemplary method 200 for forming an air bearing 16. The steps may be performed in the order shown in FIG. 7, or they may be performed in a different order. Furthermore, some steps may be performed concurrently as opposed to sequentially. In addition, some steps may be optional or may not be performed.

Referring to step 201, an inner wall 18 having a cylindrical shape is formed. The inner wall 18 has a shape which is complementary to the shape of the outer surface of the reference mass 100 or similar object so that the inner wall 18 can surround the outer surface of the reference mass 100 with a gap or space there between. The inner wall 18 also defines an object retention opening 30, which receives and retains the reference mass 100 or other objects.

Referring to step 202, an outer wall 20 having a cylindrical shape is formed. The outer wall 20 has a diameter that is greater than the diameter of the inner wall 18 and is generally concentric with the inner wall 18. The inner wall 18 and the outer wall 20 each have an inner surface and an outer surface.

Referring to step 203, an upper wall 22 having an annular shape is formed. The upper wall 22 has a generally annular shape with an inner circumference attached to an upper edge of the inner wall 18 and an outer circumference attached to an upper edge of the outer wall 20.

Referring to step 204, a lower wall 24 having an annular shape is formed. The lower wall 24 has a generally annular shape with an inner circumference attached to a lower edge of the inner wall 18 and an outer circumference attached to a lower edge of the outer wall 20. The upper wall 22 and the lower wall 24 each have an inner surface and an outer surface. The inner surfaces of the inner wall 18, the outer wall 20, the upper wall 22, and the lower wall 24 form the boundaries of an internal chamber 28.

Referring to step 205, a plurality of air outlets 32 are formed along the inner wall 18. The air outlets 32 permit compressed air to flow from the internal chamber 28 to the object retention opening 30. Each air outlet 32 is a through hole opening that extends from the inner surface of the inner wall 18 to the outer surface. The air outlets 32 are spaced apart from one another and distributed along the height and the circumference of the inner wall 18. An exemplary configuration of the air outlets 32 includes eight columns of air outlets 32 distributed evenly around the circumference of the inner wall 18, with each column including three air outlets 32 evenly spaced apart from one another along the height of the inner wall 18. The air outlets 32 are positioned around the circumference of the inner wall 18 such that select pairs of columns of air outlets 32 align along diameters of the inner wall 18. For example, referring to FIG. 6, a first column of air outlets 32A is positioned diametrically opposed to a second column of air outlets 32B. This diametric alignment of the air outlets 32 maintains the position of the reference mass 100 or other objects to be roughly in the center of the object retention opening 30.

Referring to step 206, a fitting opening 26 is formed on the outer wall 20. The fitting opening 26 is a through hole opening that is typically threaded. The fitting opening 26 is positioned on the outer wall 20 along an area of the outer wall 20 that has a greater thickness than the rest of the outer wall 20. The fitting opening 26 receives and retains the fitting 14 for the air supply hose 12.

Referring to FIGS. 8 and 9, another embodiment of the air bearing apparatus 300 is shown and includes an air supply hose 312, a fitting 314, an air bearing 316, and a mass support structure 334. The air supply hose 312, the fitting 314, and the air bearing 316 are the same as, or substantially similar to, the air supply hose 12, the fitting 14, and the air bearing 16, described above, in structure and function— although some dimensions of the air bearing 316 may be larger or smaller compared to those of the air bearing 16. In addition, features such as an internal chamber, an object retention opening, and a plurality of air outlets of the air bearing 316 are not numbered in the figures. The difference between the air bearing apparatus 10 and the air bearing apparatus 300 is that the air bearing apparatus 300 works with a different type of reference mass 400. Instead of having a cylindrical body with a diameter that is slightly smaller than the diameter of the object retention opening, the reference mass 400 is generally disc shaped with a notch extending from an edge to a center of the reference mass 400. The thickness or height of the reference mass 400 may vary in order to vary the mass or weight of the reference mass 400. This configuration of the reference mass 400 may be a standard that is widely used in scientific, engineering, and metrology applications. Given this configuration, the reference mass 100 is not retained within the object retention opening of the air bearing 316. Instead, the reference mass 100 is held by the mass support structure 334, as described in more detail below.

The mass support structure 334 includes a body 336, a rod 338, and a disc 340. The body 336 is generally cylindrical shaped and may be hollow or solid with a circumferential side surface and opposing first and second end surfaces. A diameter of the rod 338 is slightly smaller than a width of the notch in the reference mass 400. A first end of the rod 338 is attached to the second end surface of the body 336 and extends downward therefrom. A second end of the rod 338 is attached to a center the disc 340.

Referring to FIGS. 8 and 9, the air bearing apparatus 300 may operate and be used as follows. The second end of the air supply hose 312 is connected to an air compressor (not shown in the figures). Compressed air, at a selected pressure, flows through the air supply hose 312, through the fitting 314, and into the internal chamber of the air bearing 316. Compressed air exits the internal chamber through the air outlets and into the object retention opening.

The air bearing 316 may be mounted on, or held by, a fixture (not shown in the figures) that allows the force measurement device to be calibrated to be placed underneath the air bearing 316. The dynamometer or load button cell is placed beneath the object retention opening. The body 336 of the mass support structure 334 is positioned in the object retention opening, and the disc 340 rests upon the force measurement device to be calibrated, such as the arm of the tension gauge 102. One or more reference masses 400, as desired to achieve the proper weight, may be placed on the disc 340 of the mass support structure 334. The body 336 of the mass support structure 334 is held in the object retention opening of the air bearing 316 only by compressed air. Thus, the full weight of the mass support structure 334 and the weight of the reference mass(es) 400 are transferred to the device to be calibrated, such as the tension gauge 102. The air bearing apparatus 300 allows for more selective control of the amount of mass/weight that is used to calibrate a force measurement device.

ADDITIONAL CONSIDERATIONS

Throughout this specification, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current invention can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the technology has been described with reference to the embodiments illustrated in the attached drawing figures, it is noted that equivalents may be employed and substitutions made herein without departing from the scope of the technology as recited in the claims.

Having thus described various embodiments of the technology, what is claimed as new and desired to be protected by Letters Patent includes the following:

1. An air bearing for use with calibrating a force measurement device, the air bearing comprising:
   an inner wall and an outer wall, the inner wall having a cylindrical shape, the outer wall surrounding the inner wall and being spaced apart from the inner wall;
   an upper wall and a lower wall, the upper wall attached to an upper edge of the inner wall and the outer wall, and the lower wall attached to a lower edge of the inner wall and the outer wall;
   a fitting opening positioned on the outer wall and configured to retain an air supply fitting;
   an internal chamber formed by inner surfaces of the inner wall, the outer wall, the upper wall, and the lower wall, the internal chamber configured to retain compressed air;
   an object retention opening formed by an outer surface of the inner wall and configured to receive and retain an object contributing to a force measured by the force measurement device; and
   a plurality of air outlets positioned along the inner wall and configured to allow compressed air to flow from the internal chamber to the object retention opening to apply air pressure to the object.

2. The air bearing of claim 1, wherein the diameter of the inner wall is greater than a diameter of the object such that there is a gap between the object and the inner wall when the object is retained in the object retention opening.

3. The air bearing of claim 1, wherein the air outlets are positioned along the inner wall in a plurality of columns, each column including a portion of the air outlets spaced apart from one another along a height of the inner wall.

4. The air bearing of claim 3, wherein the columns of air outlets are positioned along the inner wall such that select pairs of the columns are diametrically opposed to one another.

5. An air bearing apparatus for calibrating a force measurement device, the air bearing apparatus comprising: an air bearing including an inner wall and an outer wall each having a cylindrical shape, the outer wall having a diameter that is greater than a diameter of the inner wall and being concentric with the inner wall, an upper wall and a lower wall each having an annular shape, the upper wall attached to an upper edge of the inner wall and the outer wall, and the lower wall attached to a lower edge of the inner wall and the outer wall, a fitting opening positioned on the outer wall, an internal chamber formed by inner surfaces of the inner wall, the outer wall, the upper wall, and the lower wall, the internal chamber configured to retain compressed air, an object retention opening formed by an outer surface of the inner wall and configured to receive and retain an object contributing to a force measured by the force measurement device, and a plurality of air outlets positioned along the inner wall and configured to allow compressed air to flow from the internal chamber to the object retention opening to apply air pressure to the object; a fitting attached to the fitting opening through which compressed air passes; and an air supply hose having a first end attached to the fitting and a second end configured to receive compressed air.

6. The air bearing apparatus of claim 5, further comprising a mass support structure including:
   a body generally cylindrical shaped and configured to be retained in the object retention opening,
   a rod attached to an end surface of the body, and
   a disc connected to the rod and configured to retain a reference mass.

7. The air bearing apparatus of claim 5, wherein the diameter of the inner wall is greater than a diameter of the object such that there is a gap between the object and the inner wall when the object is retained in the object retention opening.

8. The air bearing of claim 5, wherein the air outlets are positioned along the inner wall in a plurality of columns, each column including a portion of the air outlets spaced apart from one another along a height of the inner wall.

9. The air bearing of claim 8, wherein the columns of air outlets are positioned along the inner wall such that select pairs of the columns are diametrically opposed to one another.

10. A method of forming an air bearing for use with calibrating a force measurement device, the method comprising:
    forming an inner wall having a cylindrical shape with a diameter that is greater than a diameter of an object contributing to a force measured by the force measurement device, the inner wall defining an object retention opening;
    forming an outer wall having a cylindrical shape with a diameter that is greater than the diameter of the inner wall and concentric with the inner wall;
    forming an upper wall having an annular shape with an inner circumference attached to an upper edge of the inner wall and an outer circumference attached to an upper edge of the outer wall;
    forming a lower wall having an annular shape with an inner circumference attached to a lower edge of the inner wall and an outer circumference attached to a lower edge of the outer wall, wherein inner surfaces of the inner wall, the outer wall, the upper wall, and the lower wall form the boundaries of an internal chamber; and
    forming a plurality of air outlets along the inner wall, the air outlets configured to allow compressed air to flow from the internal chamber to the object retention opening.

11. The method of claim 10, further comprising forming a fitting opening on the outer wall, the fitting opening configured to retain a fitting through which compressed air flows.

12. The method of claim 10, wherein the air outlets are formed to be positioned along the inner wall in a plurality of columns, each column including a portion of the air outlets spaced apart from one another along a height of the inner wall.

13. The method of claim 12, wherein the columns of air outlets are positioned along the inner wall such that select pairs of the columns are diametrically opposed to one another.

14. The air bearing of claim 1, wherein the outer wall has a cylindrical shape, a diameter that is greater than a diameter of the inner wall, and is concentric with the inner wall.

15. The air bearing of claim 1, wherein the upper wall and the lower wall each have an annular shape.

\* \* \* \* \*